US012637989B2

(12) United States Patent
Baldwin et al.

(10) Patent No.: US 12,637,989 B2
(45) Date of Patent: May 26, 2026

(54) CAMSHAFT TONE WHEEL, SYSTEM, AND METHOD FOR DETERMINING ENGINE SPEED AND POSITION

(71) Applicant: Cummins Inc., Columbus, IN (US)

(72) Inventors: David L. Baldwin, Columbus, IN (US); Matthew Shawn Bower, North Vernon, IN (US); Xiaoyu Xie, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/845,480

(22) PCT Filed: Mar. 7, 2023

(86) PCT No.: PCT/US2023/063814
§ 371 (c)(1),
(2) Date: Sep. 10, 2024

(87) PCT Pub. No.: WO2023/177992
PCT Pub. Date: Sep. 21, 2023

(65) Prior Publication Data

US 2025/0198357 A1 Jun. 19, 2025

Related U.S. Application Data

(60) Provisional application No. 63/269,351, filed on Mar. 15, 2022.

(51) Int. Cl.
*F02D 41/00* (2006.01)

(52) U.S. Cl.
CPC ....... *F02D 41/009* (2013.01); *F02D 41/0097* (2013.01)

(58) Field of Classification Search
CPC ............... F02D 41/009; F02D 41/0097; F02D 41/266; F02D 41/38; F02D 35/028; B60W 10/04; G01P 3/488; G01M 15/06
See application file for complete search history.

(56) References Cited

U.S. PATENT DOCUMENTS 4,356,447 A 10/1982 Honig et al.
5,165,271 A 11/1992 Stepper et al.
(Continued)

FOREIGN PATENT DOCUMENTS

CA 2560262 A1 * 10/2005
CN 106762177 A 5/2017
(Continued)

OTHER PUBLICATIONS

International Search Report and Written Opinion for International patent application No. PCTUS202363814, filed Mar. 7, 2023, mailed Nov. 16, 2023, 14 pgs.
(Continued)

*Primary Examiner* — Grant Moubry
*Assistant Examiner* — James G Moubry
(74) *Attorney, Agent, or Firm* — Taft Stettinius & Hollister LLP

(57) ABSTRACT

A camshaft tone wheel, system, and method are provided for determining a rotational position of an internal combustion engine. Sensors detect unique features positioned around the camshaft tone wheel in conjunction with a tooth count on a crankshaft tone wheel, or in conjunction with elapsed time for passage of the unique features during rotation of the camshaft tone wheel, to resolve engine position and enable accurately timed combustion.

20 Claims, 4 Drawing Sheets

(56) References Cited

U.S. PATENT DOCUMENTS

| | | | |
|---|---|---|---|
| 6,286,365 B1 | 9/2001 | Lang et al. | |
| 6,415,655 B2 | 7/2002 | Loof et al. | |
| 6,609,498 B2 | 8/2003 | Mathews et al. | |
| 6,752,009 B2 | 6/2004 | Minich et al. | |
| 10,371,072 B2 | 8/2019 | Gouzenne Coutier | |
| 10,533,509 B2 | 1/2020 | Zouboff et al. | |
| 11,047,323 B2 * | 6/2021 | Jones | F02D 41/2422 |
| 2003/0163247 A1 | 8/2003 | Kobayashi et al. | |
| 2004/0074289 A1 * | 4/2004 | Galtier | F02D 41/009 73/114.26 |
| 2008/0245142 A1 * | 10/2008 | Bowling | F02D 41/009 73/114.26 |
| 2013/0096872 A1 | 4/2013 | Boehl | |
| 2014/0107904 A1 * | 4/2014 | Nefzer | F02D 45/00 701/101 |
| 2016/0138505 A1 * | 5/2016 | Nefzer | F02D 41/1401 702/151 |
| 2018/0372010 A1 * | 12/2018 | Zouboff | F02D 41/009 |
| 2019/0360410 A1 | 11/2019 | Jones | |
| 2021/0189916 A1 * | 6/2021 | Joseph | G01D 5/244 |
| 2022/0003177 A1 | 1/2022 | Joseph et al. | |

FOREIGN PATENT DOCUMENTS

| | | | |
|---|---|---|---|
| JP | H10506694 A * | 6/1998 | F02D 41/062 |
| WO | 2021165181 A1 | 8/2021 | |

OTHER PUBLICATIONS

European Patent Office, EP Search Report issued in corresponding EP Application No. 23771523, dated Feb. 4, 2026, 24 pgs.

* cited by examiner

CAMSHAFT TONE WHEEL, SYSTEM, AND METHOD FOR DETERMINING ENGINE SPEED AND POSITION

CROSS-REFERENCE TO RELATED APPLICATION

The present application is a national stage application of International Patent Application No. PCT/US23/63814, filed Mar. 7, 2023, which claims priority to and the benefit of the filing date of U.S. Provisional Application Ser. No. 63/269,351 filed Mar. 15, 2022, and the contents of both are incorporated herein by reference in their entirety.

BACKGROUND

Internal combustion engines with electronic fueling systems require accurate determination of engine start position and synchronization of fueling in the cylinders with the engine position. The engine position is typically determined by associating a crankshaft angular position with a camshaft angular position. Sensors provide output signals to the engine control unit (ECU) corresponding to the rotational passage of toothed tone wheels coupled to the crankshaft and the camshaft.

The crankshaft tone wheel typically has a tooth gap or thicker tooth that corresponds to a top-dead-center or bottom-dead-center position of a particular cylinder of the engine. The camshaft tone wheel typically has a tooth arrangement around the wheel in which a few asymmetric teeth are associated with the top-dead-center position of the cylinder. When the engine is started, one of the sensors detects the tooth sequences on the camshaft tone wheel to identify the asymmetric tooth sequence of the camshaft tone wheel, while the other sensor detects the tooth gap or thicker tooth of the crankshaft tone wheel. The ECU resolves the engine position from the sensor data.

A drawback to current approaches is that the engine position is not resolved until the asymmetric tooth sequence on the camshaft tone wheel passes by the associated sensor. This may require a complete camshaft revolution, or two crankshaft revolutions, to resolve the engine position in order to initiate fuel injection or spark timing. As a result, there is significant variability in the start times, and longer than desired average start times, for engines. While various solutions have been proposed to address these problems, there remains a need for further technological advancements in this area.

SUMMARY

One embodiment of the present application disclosed herein involves an engine speed and position sensing system. The system includes a crankshaft tone wheel with a plurality of indicators positioned around the crankshaft tone wheel and at least one interruption in the plurality of indicators. The system also includes a camshaft tone wheel including a plurality of binary features positioned around the camshaft tone wheel. Adjacent ones of the plurality of binary features each define one of a first transition or a second transition. The second transitions are located between adjacent ones of the first transitions. The plurality of first transitions are located at unique angular spacings from one another about the camshaft tone wheel. The system also includes a sensor arrangement operable to provide an output indicative of a passage of the plurality of indicators of the crankshaft tone wheel and a passage of the first and second transitions of the camshaft tone wheel. The system further includes a control unit configured to resolve an engine position in response to the passage of a number of the plurality of indicators of the crankshaft tone wheel that identifies the corresponding first and second transitions of the camshaft tone wheel.

In one embodiment, a tone wheel for a camshaft includes a circular member having a rotational center and a plurality of angular regions positioned around the rotational center. Each of the plurality of angular regions includes a pair of binary features with a transition between the pair of binary features that is uniquely positioned within the respective angular region in relation to a positioning of the transitions within the other angular regions.

In another embodiment, a method for determining an engine position includes sensing a transition between a pair of binary features of a camshaft tone wheel; determining a number of indicators of a crankshaft tone wheel associated with the transition; and resolving the engine position based on the number of indicators associated with the transition.

Further embodiments, forms, objects, features, advantages, aspects, and benefits shall become apparent from the following description and drawings.

DESCRIPTION OF THE ILLUSTRATIVE EMBODIMENTS

Figure 1:
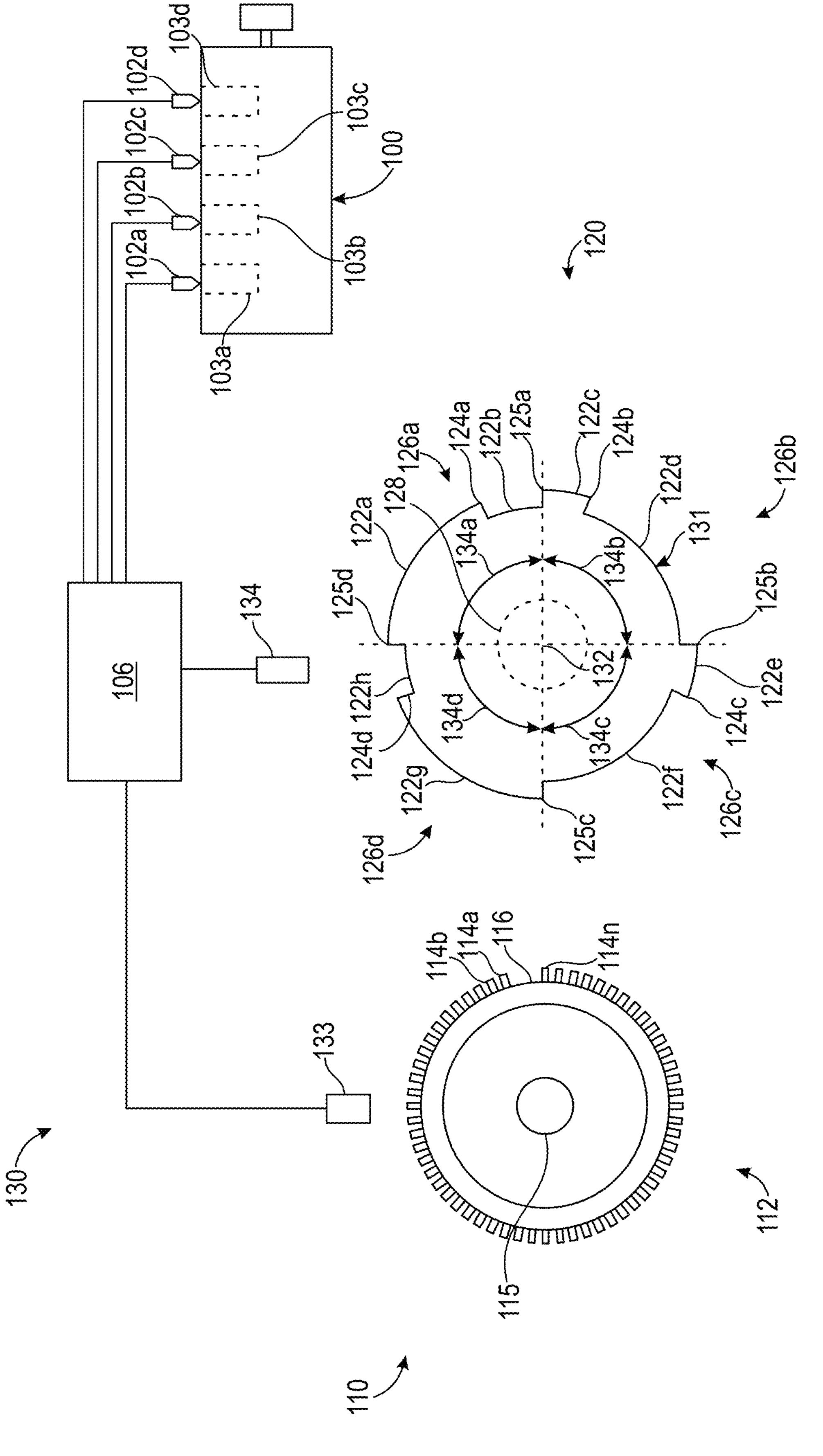
FIG. 1 is a schematic view of an embodiment of an engine position and speed sensing system according to the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an internal combustion engine 100 is shown that includes a plurality of fuel injectors 102*a*, 102*b*, 102*c*, 102*d* for providing fuel for combustion in a combustion chamber of an associated cylinder 103*a*, 103*b*, 103*c*, 103*d* of engine 100. Fuel injectors 102*a*, 102*b*, 102*c*, 102*d* receive fuel from a fuel system (not shown), and are controlled to inject fuel in response to fueling commands from an engine control unit 106.

The timing of combustion events, such as fuel injection or spark timing, relative to the piston location in the respective combustion chambers 103*a*, 103*b*, 103*c*, 103*d* are precisely controlled to provide the desired combustion timing and combustion output. According to the present disclosure, an engine speed and position sensing system 110 is provided to determine an engine position prior to initiating the combustion event.

System 110 includes a crankshaft tone wheel 112. Crankshaft tone wheel 112 can be mounted on a crankshaft 115. Crankshaft tone wheel 112 includes a plurality of indicators 114*a*, 114*b*, . . . 114*n* positioned around crankshaft tone wheel 112, such as around the perimeter of crankshaft tone wheel 112. Crankshaft tone wheel 112 also includes at least one interruption 116 in the plurality of indicators 114*a*, 114*b*, . . . 114*n*.

System 110 also includes a camshaft tone wheel 120 including a plurality of binary features 122*a*, 122*b*, 122*c*, 122*d*, 122*e*, 122*f*, 122*g*, 122*h* positioned around the camshaft tone wheel 120. Adjacent ones of the plurality of binary features 122*a*, 122*b*, 122*c*, 122*d*, 122*e*, 122*f*, 122*g*, 122*h* each define one of a first transition 124*a*, 124*b*, 124*c*, 124*d* or a second transition 125*a*, 125*b*, 125*c*, 125*d*. The second transitions 125*a*, 125*b*, 125*c*, 125*d* are located between adjacent ones of the first transitions 124*a*, 124*b*, 124*c*, 124*d*. The plurality of first transitions 124*a*, 124*b*, 124*c*, 124*d* are located at a unique angular spacing from one another about the camshaft tone wheel 120.

System 110 includes a sensor arrangement 130 operable to provide an output indicative of a passage of the plurality of indicators 114*a*, 114*b* . . . 114*n* of the crankshaft tone wheel 112 and a passage of the first transitions 124*a*, 124*b*, 124*c*, 124*d* and second transitions 125*a*, 125*b*, 125*c*, 125*d* of the camshaft tone wheel 120. The control unit 106 is configured to resolve an engine position in response to the passage of a number of the plurality of indicators 114*a*, 114*b* . . . 114*n* of the crankshaft tone wheel 112 that identifies at least one of the first transitions 124*a*, 124*b*, 124*c*, 124*d* or second transitions 125*a*, 125*b*, 125*c*, 125*d* of the camshaft tone wheel 120.

In an embodiment, a tone wheel 120 for a camshaft 128 is provided. The tone wheel 120 includes a circular wheel member 131 having a rotational center 132 and a plurality of angular regions 134*a*, 134*b*, 134*c*, 134*d* positioned around the rotational center 132. Each of the plurality of angular regions 134*a*, 134*b*, 134*c*, 134*d* includes a pair of binary features 122*a*, 122*b*; 122*c*, 122*d*; 122*e*, 122*f*; or 122*g*, 122*h* with a transition 124*a*, 124*b*, 124*c*, or 124*d* between the paired binary features 122*a*, 122*b*; 122*c*, 122*d*; 122*e*, 122*f*; or 122*g*, 122*h* that is uniquely positioned within the respective angular region 134*a*, 134*b*, 134*c*, 134*d* in relation to a positioning of the transitions 124*a*, 124*b*, 124*c*, 124*d* within the other angular regions 134*a*, 134*b*, 134*c*, 134*d*.

In an embodiment, a method for determining an engine position is provided. The method includes sensing a transition 124*a*, 125*a*, 124*b*, 125*b*, 124*c*, 125*c*, 124*d*, 125*d* between an adjacent pair of the binary features 122*a*, 122*b*, 122*c*, 122*d*, 122*e*, 122*f*, 122*g*, 122*h* of the camshaft tone wheel 120 as the camshaft tone wheel 120 rotates; determining a number of indicators 114*a*, 114*b* . . . 114*n* of the rotating crankshaft tone wheel 112 associated with the transition 124*a*, 124*b*, 124*c*, 124*d*, 125*a*, 125*b*, 125*c*, 125*d*; and resolving the engine position based on the number of indicators 114*a*, 114*b* . . . 114*n* associated with the transition 124*a*, 125*a*, 124*b*, 125*b*, 124*c*, 125*c*, 124*d*, 125*d*.

In an embodiment, the sensor arrangement 130 includes a first sensor 133 associated with the crankshaft tone wheel 112 and a second sensor 134 associated with the camshaft tone wheel 120. The sensors 133, 134 can be, for example, Hall effect sensors operable to determine engine speed and position by sensing passage thereby of a number of spaced indicators or transitions formed on a crankshaft tone wheel 112 and/or camshaft tone wheel 120. However, any suitable sensor or sensors, such as variable reluctance sensors, can be employed with sensor arrangement 130 that is capable of detecting indicators 114*a*, 114*b*, . . . 114*n* and transitions 124*a*, 124*b*, 124*c*, 124*d*, 125*a*, 125*b*, 125*c*, 125*d*.

In an embodiment, each one of transitions 124*a*, 124*b*, 124*c*, 124*d*, 125*a*, 125*b*, 125*c*, 125*d* is identified by a type of transition (e.g. high-to-low or low-to-high) and a number the indicators 114*a*, 114*b*, . . . 114*n* corresponding to an angular rotation of the camshaft tone wheel 120 relative to the crankshaft tone wheel 112 from one transition to the next. This allows the particular transition 124*a*, 124*b*, 124*c*, 124*d*, 125*a*, 125*b*, 125*c*, 125*d* that is sensed by sensor arrangement 130 to be identified by counting the indicators 114*a*, 114*b* . . . 114*n* sensed by sensor arrangement 130 as the camshaft tone wheel 120 rotates from one transition to the next transition and as the crankshaft tone wheel 112 rotates from one indicator to the next indicator.

In an embodiment, the plurality of binary features 122*a*, 122*b*, 122*c*, 122*d*, 122*e*, 122*f*, 122*g*, 122*h* include a number of paired binary features, such as a first pair 122*a*, 122*b*; a second pair 122*c*, 122*d*; a third pair 122*e*, 122*f*; and a fourth pair 122*g*, 122*h*. Each one of the paired binary features 122*a*, 122*b*; 122*c*, 122*d*; 122*e*, 122*f*; and 122*g*, 122*h* are located in a corresponding segment 126*a*, 126*b*, 126*c*, 126*d* of the camshaft tone wheel 120.

In an embodiment, each of the segments 126*a*, 126*b*, 126*c*, 126*d* of the camshaft tone wheel 120 has a same angular sweep about the camshaft tone wheel 120, and corresponds to a same number of indicators 114*a*, 114*b* . . . 114*n* of the crankshaft tone wheel 112. For example, in the illustrated embodiment of FIG. 1, each of the segments 126*a*, 126*b*, 126*c*, 126*d* has an angular sweep of 90 degrees about the camshaft tone wheel 120. As a result, the second transitions 125*a*, 125*b*, 125*c*, 125*d* are located equi-angularly at 90 degrees from one another about the camshaft tone wheel 120. An equi-angular sweep for segments 126*a*, 126*b*, 126*c*, 126*d* can be employed, for example, in an engine 100 with uniformly spaced cylinder firing. Other embodiments contemplate that segments 126*a*, 126*b*, 126*c*, 126*d* do not have the same angular sweep, such as for an engine 100 that does not employ uniformly spaced cylinder firing.

Figure 2:
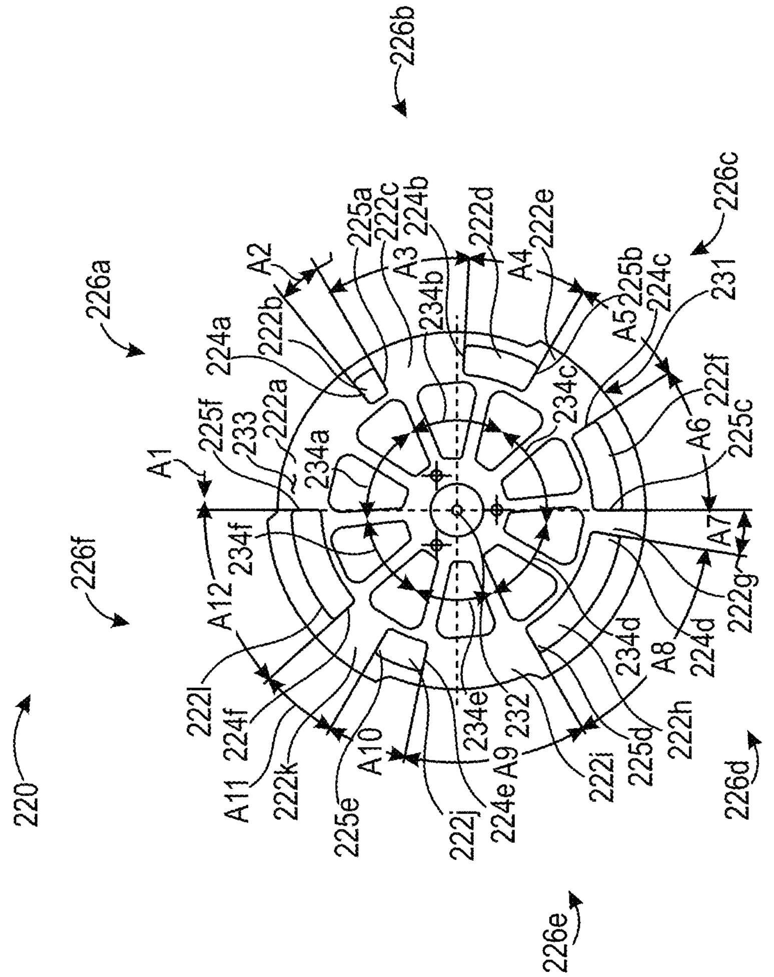
FIG. 2 is a plan view of an embodiment of a camshaft tone wheel according to the present disclosure.

In an embodiment, the plurality of indicators 114*a*, 114*b*, . . . 114*n* of the crankshaft tone wheel 112 are teeth distributed about a periphery of the crankshaft tone wheel 112. In an embodiment, the crankshaft tone wheel 112 includes 58 teeth, and the interruption 116 corresponds to a gap formed by two missing teeth. However, other numbers of indicators and gap arrangements are also contemplated. In addition, each of the binary features 122*a*, 122*b*, 122*c*, 122*d*, 122*e*, 122*f*, 122*g*, 122*h* of the camshaft tone wheel 120 can be defined as a raised area or a lower area located about a periphery of the camshaft tone wheel 120 as shown in FIG. 1. Alternatively, as shown in FIG. 2 and discussed further below, the binary features 122*a*, 122*b*, 122*c*, 122*d*, 122*e*, 122*f*, 122*g*, 122*h* can be located on a face of the wheel member 131.

In an embodiment, the plurality of binary features 122*a*, 122*b*, 122*c*, 122*d*, 122*e*, 122*f*, 122*g*, 122*h* include opposing binary features, such as opposing binary features 122*a* and 122*f*, positioned on opposite sides of the camshaft tone wheel 120. One of the opposing binary features, such as binary feature 122*a*, is a raised area, and the other of the opposing binary features, such as binary feature 122*f*, is a lower area. The transitions 124*a*, 124*b*, 124*c*, 124*d*, 125*a*, 125*b*, 125*c*, 125*d* are defined by the junctions of the corresponding raised and lower areas.

One of the raised and lower areas of the opposed binary features 122*a*, 122*f* (or other opposed binary features) is synced with the at least one interruption 116 of the crankshaft tone wheel 112. Since the camshaft polarity toggles between top-dead-center and bottom-dead-center each time the interruption 116 is sensed, the controller 106 can determine the camshaft half cycle (i.e. engine position) upon the first detection of interruption 116.

In an embodiment, the number of the plurality of binary features 122*a*, 122*b*, 122*c*, 122*d*, 122*e*, 122*f*, 122*g*, 122*h* is related to a total number of fuel injectors 102*a*, 102*b*, 102*c*, 102*d* operated by the control unit 106. For example, eight binary features 122*a*, 122*b*, 122*c*, 122*d*, 122*e*, 122*f*, 122*g*, 122*h* are shown in the FIG. 1 embodiment so that the four evenly spaced second transitions 125*a*, 125*b*, 125*c*, 125*d* correspond to a top-dead-center position of the pistons in the combustion chambers that receive fuel from the fuel injectors 102*a*, 102*b*, 102*c*, 102*d*. The unique spacing provided by the preceding first transition 124*a*, 124*b*, 124*c*, 124*d* allows the following second transition 125*a*, 125*b*, 125*c*, 125*d* to be identified along with its assigned injector/piston. All the transitions 124*a*, 124*b*, 124*c*, 124*d*, 125*a*, 125*b*, 125*c*, 125*d* are known in the crank angle domain of the crankshaft along with the top-dead-center positions of the pistons in each cylinder.

FIG. 2 shows another embodiment camshaft tone wheel 220. Camshaft tone wheel 220 is similar to camshaft tone wheel 120, but includes six segments 226*a*, 226*b*, 226*c*, 226*d*, 226*e*, 226*f* spaced around the rotational center 232 of the wheel member 231 rather than the four segments 126*a*, 126*b*, 126*c*, 126*d* for camshaft tone wheel 120. Other embodiments contemplate yet other numbers of segments depending on the application in which camshaft tone wheel is employed.

Camshaft tone wheel 220 includes a plurality of binary features 222*a*, 222*b*, 222*c*, 222*d*, 222*e*, 222*f*, 222*g*, 222*h*, 222*i*, 222*j*, 222*k*, 222*l* positioned around a face 233 of wheel member 231 of the camshaft tone wheel 220. The binary features 222*a*, 222*c*, 222*e*, 222*g*, 222*i*, 222*k*, can each be formed by a tooth or raised area from face 233, and the binary features 222*b*, 222*d*, 222*f*, 222*h*, 222*j*, 222*l* can each be formed by a notch or lower area in face 233. Each tooth or raised area can form a flat along the face 233, and each notch or lower area can form a gap along the face 233. Adjacent ones of the plurality of binary features 222*a*, 222*b*, 222*c*, 222*d*, 222*e*, 222*f*, 222*g*, 222*h*, 222*i*, 222*j*, 222*k*, 222*l* each define one of a first transition 224*a*, 224*b*, 224*c*, 224*d*, 224*e*, 224*f* or a second transition 225*a*, 225*b*, 225*c*, 225*d*, 225*e*, 225*f*. The second transitions 225*a*, 225*b*, 225*c*, 225*d*, 225*e*, 225*f* are located between adjacent ones of the first transitions 224*a*, 224*b*, 224*c*, 224*d*, 224*e*, 224*f*. The plurality of first transitions 224*a*, 224*b*, 224*c*, 224*d*, 224*e*, 224*f* are located at a unique angular spacing from one another about the camshaft tone wheel 220. The second transitions 225*a*, 225*b*, 225*c*, 225*d*, 225*e*, 225*f* are located equi-angularly from one another about the camshaft tone wheel 220

Camshaft tone wheel 220 includes a plurality of angular regions 234*a*, 234*b*, 234*c*, 234*d*, 234*e*, 234*f* extending from the rotational center 232. Each of the plurality of angular regions 234*a*, 234*b*, 234*c*, 234*d*, 234*e*, 234*f* forms one of the six segments 226*a*, 226*b*, 226*c*, 226*d*, 226*e*, 226*f*. Each angular region 234*a*, 234*b*, 234*c*, 234*d*, 234*e*, 234*f* includes a pair of binary features 222*a*, 222*b*; 222*c*, 222*d*; 222*e*, 222*f*; or 222*g*, 222*h*, respectively. The first transitions 224*a*, 224*b*, 224*c*, 224*d*, 224*e* and 224*f* between the paired binary features 222*a*, 222*b*; 222*c*, 222*d*; 222*e*, 222*f*; and 222*g*, 222*h* are uniquely positioned within the respective angular region 234*a*, 234*b*, 234*c*, 234*d*, 234*e*, 234*f* in relation to a positioning of the first transitions 224*a*, 224*b*, 224*c*, 224*d*, 224*e*, 224*f* within the other angular regions 234*a*, 234*b*, 234*c*, 234*d*, 234*e*, 234*f*.

In use, one of the first and second transitions 224*a*, 225*a*, 224*b*, 225*b*, 224*c*, 225*c*, 224*d*, 225*d*, 224*e*, 225*e*, 224*f*, 225*f* of the rotating camshaft tone wheel 220 is sensed. The number of indicators 114*a*, 114*b* . . . 114*n* of the rotating crankshaft tone wheel 112 that is associated with the sensed transitions 224*a*, 225*a*, 224*b*, 225*b*, 224*c*, 225*c*, 224*d*, 225*d*, 224*e*, 225*e*, 224*f*, 225*f* is sensed. The engine position is resolved based on the number of indicators 114*a*, 114*b* . . . 114*n* associated with the sensed transitions 224*a*, 225*a*, 224*b*, 225*b*, 224*c*, 225*c*, 224*d*, 225*d*, 224*e*, 225*e*, 224*f*, 225*f*.

Figure 3:
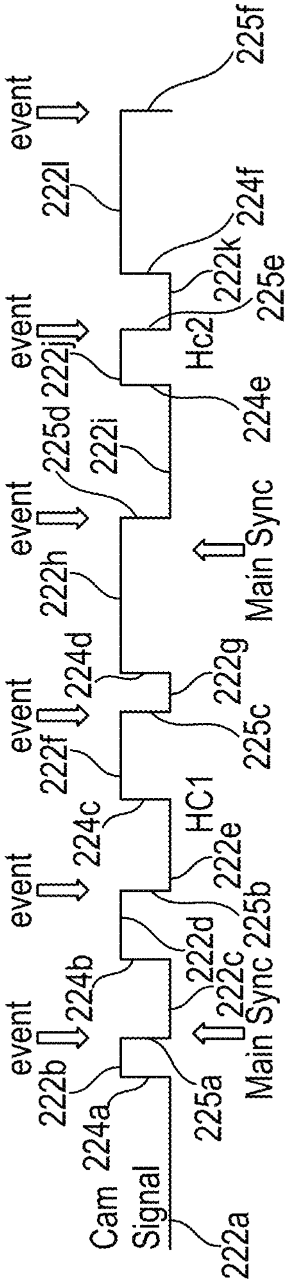
FIG. 3 is a schematic representation of a sensor output relating to the camshaft tone wheel of FIG. 2.

For example, as shown in FIG. 3, the sensor arrangement 130 is operable to detect the alternating high-low and then low-high arrangements of the transitions 224*a*, 225*a*, 224*b*, 225*b*, 224*c*, 225*c*, 224*d*, 225*d*, 224*e*, 225*e*, 224*f*, 225*f*. The first, uniquely angularly spaced transitions 224*a*, 224*b*, 224*c*, 224*d*, 224*e*, 224*f* each indicate a separate event at the following corresponding second transition 225*a*, 225*b*, 225*c*, 225*d*, 225*e*, 225*f*. The event could be, for example, a top-dead-center position of a piston in the combustion chamber associated with one of the fuel injectors. The control unit 106 can then determine the engine position by identifying the sensed second transitions 225*a*, 225*b*, 225*c*, 225*d*, 225*e*, 225*f* based on the tooth count from the preceding first transition 224*a*, 224*b*, 224*c*, 224*d*, 224*e*, 224*f*. In addition, as discussed above, two opposite ones of the binary features, such as binary features 222*c* and 222*h* in FIG. 3, can synced to the interruption 116 of the crankshaft tone wheel 112 so the location of the crankshaft tone wheel 112 in the cam or engine half cycle can be determined.

In an embodiment, each one of transitions 224*a*, 224*b*, 224*c*, 224*d*, 224*e*, 224*f*, 225*a*, 225*b*, 225*c*, 225*d*, 225*e*, 225*f* is identified by a type of transition (e.g. high-to-low or low-to-high) and a number of the indicators 114*a*, 114*b* . . . 114*n* corresponding to an angular rotation of the camshaft tone wheel 220 relative to the crankshaft tone wheel 112 from one transition to the next. This allows the particular transition 224*a*, 224*b*, 224*c*, 224*d*, 224*e*, 224*f*, 225*a*, 225*b*, 225*c*, 225*d*, 225*e*, 225*f* that is sensed by sensor arrangement 130 to be identified by counting the indicators 114*a*, 114*b* . . . 114*n* sensed by sensor arrangement 130 as the camshaft tone wheel 220 rotates from one transition to the next transition and as the crankshaft tone wheel 112 rotates.

In an embodiment, the combination of binary feature polarity and indicator count between transitions 224*a*, 224*b*, 224*c*, 224*d*, 224*e*, 224*f*, 225*a*, 225*b*, 225*c*, 225*d*, 225*e*, 225*f* is unique. The engine position can be determined since each transition 224*a*, 224*b*, 224*c*, 224*d*, 224*e*, 224*f*, 225*a*, 225*b*, 225*c*, 225*d*, 225*e*, 225*f* is associated with a unique indicator count (i.e. crank angle), and since the number of indicators 114*a*, 114*b*, . . . 114*n* between every pairing of sequential transitions and the absolute indicator count at each transition 224*a*, 224*b*, 224*c*, 224*d*, 224*e*, 224*f*, 225*a*, 225*b*, 225*c*, 225*d*, 225*e*, 225*f* are calibrated or known.

In an embodiment, the plurality of binary features 222*a*, 222*b*, 222*c*, 222*d*, 222*e*, 222*f*, 222*g*, 222*h*, 222*i*, 222*j*, 222*k*, 222*l* include a number of paired binary features, such as a first pair 222*a*, 222*b*; a second pair 222*c*, 222*d*; a third pair 222*e*, 222*f*; a fourth pair 222*g*, 222*h*; a fifth pair 222*i*, 222*j*; and a sixth pair 222*k*, 222*l*. Each one of the paired binary features 222*a*, 222*b*; 222*c*, 222*d*; 222*e*, 222*f*; 222*g*, 222*h*; 222*i*, 222*j*; and 222*k*, 222*l* are located in a corresponding segment 226*a*, 226*b*, 226*c*, 226*d*, 226*e*, 226*f* of the camshaft tone wheel 220 defined by the annular regions 234*a*, 234*b*, 234*c*, 234*d*, 234*e*, 234*f*. Each of the segments 226*a*, 226*b*, 226*c*, 226*d*, 226*e*, 226*f* or the annular regions 234*a*, 234*b*, 234*c*, 234*d*, 234*e*, 234*f* of the camshaft tone wheel 220 has a same angular sweep about the center 232 of camshaft tone wheel 220, and corresponds to a same number of indicators 114*a*, 114*b* . . . 114*n* of the crankshaft tone wheel 112. For example, in the illustrated embodiment of FIG. 2, each of the annular regions 234*a*, 234*b*, 234*c*, 234*d*, 234*e*, 234*f* has an angular sweep of 60 degrees about the center 232 of camshaft tone wheel 220. As a result, the second transitions 225*a*, 225*b*, 225*c*, 225*d*, 225*e*, 225*f* are located equi-angularly from one another about the camshaft tone wheel 220.

In an embodiment, the number of the plurality of binary features 222*a*, 222*b*, 222*c*, 222*d*, 222*e*, 222*f*, 222*g*, 222*h*, 222*i*, 222*j*, 222*k*, 222*l* is related to a total number of fuel injectors operated by the control unit 106. For example, twelve binary features 222*a*, 222*b*, 222*c*, 222*d*, 222*e*, 222*f*, 222*g*, 222*h*, 222*i*, 222*j*, 222*k*, 222*l* are shown in the FIG. 2 embodiment so that the six uniquely spaced first transitions 224*a*, 224*b*, 224*c*, 224*d*, 224*e*, 224*f* can be used to identify the six second transition 225*a*, 225*b*, 225*c*, 225*d*, 225*e*, 225*f* that correspond to a top-dead-center position of the pistons in six combustion chambers that receive fuel from six fuel injectors.

In an embodiment of camshaft tone wheel 220, the plurality of angular regions 234*a*, 234*b*, 234*c*, 234*d*, 234*e*, 234*f* includes a first angular region 234*a* subtending a first arc about the rotational center 232. The paired binary features 222*a*, 222*b* of the first angular region 234*a* include a first feature 222*a* subtending a first portion A1 of the first arc from a start of the first angular region 234*a* and a second feature 222*b* subtending a second portion A2 of the first arc to an end of the first angular region 234*a*.

The plurality of angular regions 234*a*, 234*b*, 234*c*, 234*d*, 234*e*, 234*f* includes a second angular region 234*b* subtending a second arc about the rotational center 232 from the end of the first angular region 234*a*. The paired binary features 222*c*, 222*d* of the second angular region 234*b* includes a third feature 222*c* subtending a first portion A3 of the second arc from the end of the first angular region 234*a* and a fourth feature 222*d* subtending a second portion A4 of the second arc to an end of the second angular region 234*b*. The angle subtended by the first portion A1 of the first arc differs from the angle subtended by the first portion A3 of the second arc, and an angle subtended by the second portion A2 of the first arc differs from an angle subtended by the second portion A4 of the second arc. However, the first and second arcs subtend the same angle. As a result, first transitions 224*a*, 224*b* are located at different angular distances from the start of the corresponding annular regions 234*a*, 234*b*, but second transitions 225*a*, 225*b* are located at a same angular distance from the start of the corresponding annular regions 234*a*, 234*b*.

The above configuration is carried on through each of the plurality of angular regions 234*a*, 234*b*, 234*c*, 234*d*, 234*e*, 234*f* in the illustrated embodiment. For example, a third angular region 234*c* subtends a third arc about the rotational center 232 that is the same as the first and second arcs subtended by the first and second angular regions 234*a*, 234*b*. The paired binary features 222*e*, 222*f* of the third angular region 234*c* includes a fifth feature 222*e* subtending a first portion A5 of the third arc from the end of the second angular region 234*b* and a sixth feature 222*f* subtending a second portion A6 of the third arc to an end of the third angular region 234*c*.

In the illustrated embodiment, a fourth angular region 234*d* subtends a fourth arc about the rotational center 232 that is the same as the first, second, and third arcs subtended by the first, second and third angular regions 234*a*, 234*b*, 234*c*. The paired binary features 222*g*, 222*h* of the fourth angular region 234*d* include a seventh feature 222*g* subtending a first portion A7 of the fourth arc from the end of the third angular region 234*c* and an eighth feature 222*h* subtending a second portion A8 of the fourth arc to an end of the fourth angular region 234*d*.

The angles subtended by the first portions A5, A7 of the third and fourth arcs differ from one another and differ from the angles subtended by the first portions A1, A3 of the first and second arcs of the first and second annular regions 234*a*, 234*b*. The angles subtended by the second portions A6, A8 of the third and fourth arcs of the third and fourth angular regions 234*c*, 234*d* differ from one another and differ from the angles subtended by the second portions A2, A4 of the first and second arcs of the first and second angular regions 234*a*, 234*b*.

In the illustrated embodiment, a fifth angular region 234*e* subtends a fifth arc about the rotational center 232 that is the same as the first, second, third, and fourth arcs subtended by the first, second, third, and fourth angular regions 234*a*, 234*b*, 234*c*, 234*d*. The paired binary features 222*i*, 222*j* of the fifth angular region 234*e* includes a ninth feature 222*i* subtending a first portion A9 of the fifth arc from the end of the fourth angular region 234*d* and a tenth feature 222*j* subtending a second portion A10 of the third arc to an end of the fifth angular region 234*e*.

In the illustrated embodiment, a sixth angular region 234*f* subtends a sixth arc about the rotational center 232 that is the same as the first, second, third, fourth and fifth arcs subtended by the first, second, third, fourth, and fifth angular regions 234*a*, 234*b*, 234*c*, 234*d*. 234*e*. The paired binary features 222*k*, 222*l* of the sixth angular region 234*f* includes an eleventh feature 222*k* subtending a first portion A11 of the sixth arc from the end of the fifth angular region 234*e* and a twelfth feature 222*l* subtending a second portion A12 of the sixth arc to an end of the sixth angular region 234*f* and the start of the first angular regions 234*a*.

The angles subtended by the first portions A9, A11 of the fifth and sixth arcs differ from one another and differ from the angles subtended by the first portions A1, A3, A5, A7 of the first, second, third, and fourth arcs of the first, second, third, and fourth annular regions 234*a*, 234*b*, 234*c*, 234*d*. The angles subtended by the second portions A10, A12 of the fifth and sixth arcs of the fifth and sixth angular regions 234*e*, 234*f* differ from one another and differ from the angles subtended by the second portions A2, A4, A6, A8 of the first, second, third, and fourth arcs of the first, second, third, and fourth angular regions 234*a*, 234*b*, 234*c*, 234*d*.

The exemplary procedures disclosed herein provide for determining a position of engine 100 to start engine 100 by initiating a combustion event, such as fuel injection or spark ignition, at an appropriate timing in the crank angle domain of the crankshaft. Operations illustrated are understood to be exemplary only, and operations may be combined or divided, and added or removed, as well as re-ordered in whole or part, unless stated explicitly to the contrary herein. Certain operations illustrated may be implemented by a computer such as control unit 106 executing a computer program product on a computer readable, non-transitory medium, where the computer program product comprises instructions causing the computer to execute one or more of the operations, or to issue commands to other devices to execute one or more of the operations.

Figure 4:
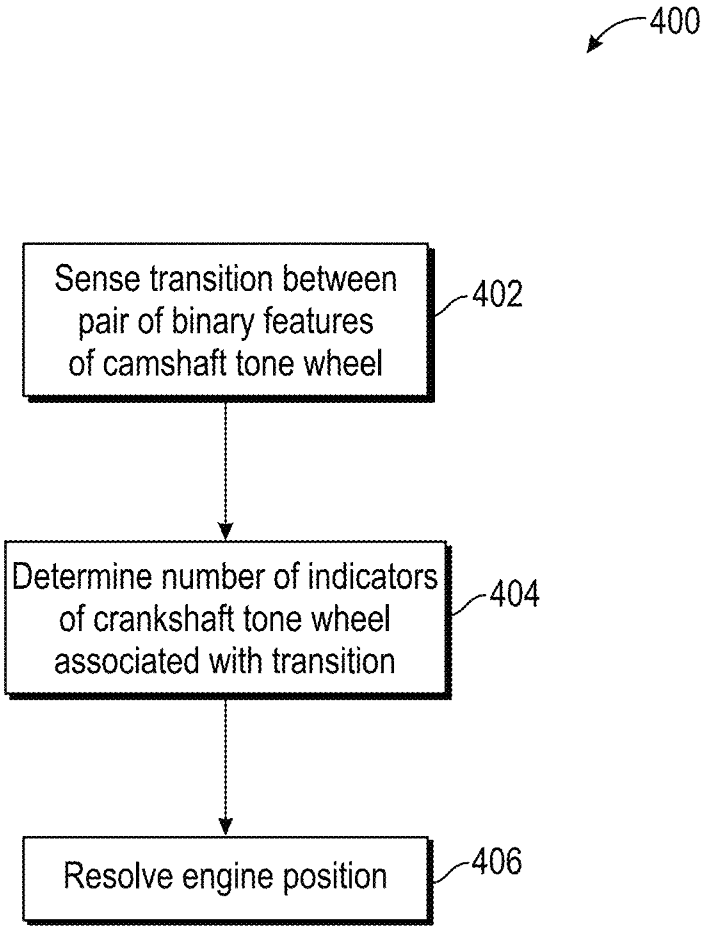
FIG. 4 is a flow diagram of an embodiment of a method for determining engine speed and position according to the present disclosure.

Referring to FIG. 4, an embodiment of a method 400 for determining an engine position is provided. Method 400 is described with reference to camshaft tone wheel 120, but can also be employed with camshaft tone wheel 220. Method includes an operation 402 for sensing a transition 124*a*, 125*a*, 124*b*, 125*b*, 124*c*, 125*c*, 124*d*, 125*d* between a pair of binary features 122*a*, 122*b*, 122*c*, 122*d*, 122*e*, 122*f*, 122*g*, 122*h* of camshaft tone wheel 120 as the camshaft wheel 120 rotates. Method 400 continues at operation 402 to determine a number of indicators 114*a*, 114*b* . . . 144*n* of a rotating crankshaft tone wheel 112 associated with the sensed transition 124*a*, 125*a*, 124*b*, 125*b*, 124*c*, 125*c*, 124*d*, 125*d*. Method 400 continues at operation 404 to resolve the engine position based on the number of indicators 114*a*, 114*b* . . . 114*n* associated with the sensed transition 124*a*, 125*a*, 124*b*, 125*b*, 124*c*, 125*c*, 124*d*, 125*d*.

In an embodiment, method 400 includes sensing a next transition 124*a*, 125*a*, 124*b*, 125*b*, 124*c*, 125*c*, 124*d*, 125*d* between the next pair of the binary features 122*a*, 122*b*, 122*c*, 122*d*, 122*e*, 122*f*, 122*g*, 122*h* of the camshaft tone wheel 120. A second number of indicators 114*a*, 114*b* . . . 114*n* of the crankshaft tone wheel 112 associated with the sensed next transition 124*a*, 125*a*, 124*b*, 125*b*, 124*c*, 125*c*, 124*d*, 125*d* is then determined. The engine position is resolved based on the second number of indicators associated with the sensed next transition 124*a*, 125*a*, 124*b*, 125*b*, 124*c*, 125*c*, 124*d*, 125*d* in addition to the number of indicators associated with the sensed transition 124*a*, 125*a*, 124*b*, 125*b*, 124*c*, 125*c*, 124*d*, 125*d*. In an embodiment, the method 400 includes determining the engine position based on a time for the camshaft tone wheel 120 to rotate from one transition 124*a*, 125*a*, 124*b*, 125*b*, 124*c*, 125*c*, 124*d*, 125*d* to the next transition 124*a*, 125*a*, 124*b*, 125*b*, 124*c*, 125*c*, 124*d*, 125*d*.

The camshaft tone wheels 120, 220 provide multiple unique transitions that can be sensed in order to determine engine position in less than one engine cycle, i.e. less than two complete revolutions of the crankshaft tone wheel 112. Once the engine position is known, crankshaft tone wheel 112 is typically used for precise engine speed measurement and combustion event timing control due to the higher resolution provided by the relatively larger number of indicators 114*a*, 114*b*, . . . 114*n* as compared to the number of transitions of the camshaft tone wheel 120, 220. However, camshaft tone wheel 120, 220 can also be used for engine speed measurement and combustion event timing control due to the known angular spacing between the second transitions that define the start and end of each angular regions in the event control unit 106 is not able to receive signals providing the passage of indicators 114*a*, 114*b*, . . . 114*n* due to, for example, sensor or crankshaft tone wheel malfunction.

The engine speed and position sensing system 110 according to the present disclosure can utilize rising and falling edge detection of the transitions that are unique in spacing and/or direction (e.g. high-to-low or low-to-high) from one another on camshaft tone wheels 120, 220. The edge detections can be referenced to a common high speed timer in controller 106. Since every transition of the camshaft tone wheels 120, 220 is uniquely spaced from and/or in a unique high-to-low or low-to-high direction from the preceding transition, engine position information can be determined in the crank angle domain defined by the crankshaft tone wheel 112 for every transition-to-transition pairing of the camshaft tone wheel 120, 220.

The angular regions with the paired binary features can have the same angular sweep about the rotational center of the tone wheel as shown above. Such an arrangement can be useful for an engine with a symmetric or uniform angular firing pattern. However, the angular regions need not have the same angular sweep about the rotational center of the camshaft tone wheel.

For example, with reference to camshaft tone wheel 120, the angular regions 126*a*, 126*b*, 126*c*, 126*d* can be configured to correspond to an asymmetric engine angle firing pattern of the engine, with some of the angular regions 126*a*, 126*b*, 126*c*, 126*d* having an angular sweep, such as 30, 60, 90 or 120 degrees, that differs from the angular sweep of other angular regions 126*a*, 126*b*, 126*c*, 126*d*.

For engines with lower cylinder counts, such as three or four cylinders, the cam tone wheel can be provided with more paired binary features and associated angular regions than there are cylinders. For example, a camshaft tone wheel 220 with six angular regions 234*a*, 234*b*, 234*c*, 234*d*, 234*e*, 234*f* and associated paired binary features could be used for a three or four cylinder engine. As a result, an engine rotational position for the three or four cylinder engine can be resolved more quickly as compared to using a tone wheel with fewer angular regions.

For engines with higher cylinder counts, such as sixteen cylinders, twenty cylinders, or potentially more cylinders, the indicators 114*a*, 114*b*, . . . 114*n* of the crankshaft tone wheel 110 may not be able to provide the granularity and robustness desired for detection of a camshaft tone wheel with a corresponding number (twenty or more) of paired binary features and associated angular regions. The camshaft tone wheel of the present disclosure could still be employed in such engines by assigning a paired binary feature count that is an integer of the engine cylinder count. For example, an engine with twenty cylinders could leverage a camshaft tone wheel with five or ten paired binary features and associated angular regions. An engine with sixteen cylinders could leverage a camshaft tone wheel with four or eight paired binary features and associated angular regions. In addition, the paired binary features can be employed to time multiple combustion events during an engine cycle.

In an embodiment, a Bayesian algorithm can be employed to process the signal data and resolve the engine position. The Bayesian algorithm can provide robustness against signal noise in counting the indicators 114*a*, 114*b*, . . . 114*n* of the crankshaft tone wheel 112. In addition, the Bayesian algorithm provides robustness against changing velocity and/or when operating in the time domain due to, for example, the loss of the crankshaft tone wheel 112. Since every other transition (i.e. the second transitions) is located at a known spacing from one another, the camshaft tone wheel 120, 220 simplifies back-up engine speed calculations and combustion event scheduling.

In an embodiment, a Bayesian factor for the engine position estimation is calculated on an ongoing basis with limits or clamps to prevent saturation. For example, in the camshaft tone wheel 220, there are twelve unique transitions which can be hypothesized or initially predicted as the sensed transition. Since there is a unique spacing between successive transitions, there is an expectation for the number of indicators 114*a*, 114*b*, . . . 114*n* that will pass, or an amount of time that will elapse, when the next successive transition is observed. Bayesian factors are determined for the initial predictions to resolve how closely the predictions match the observations until a transition and associated engine position can be selected that provides the desired certainty. In an embodiment, the initial transition prediction is biased using data regarding a previous stop position of the engine. In an embodiment, statistically preferred engine stop locations, such as those preferred due to the mechanical structure of the engine, can be used to bias the initial transition prediction when the previous stop position is not applicable. A bi-direction sensor can also be used to track reverse engine rotation when the engine is about to stop to determine the engine stop position.

The camshaft tone wheel 120, 220 can also be employed to determine engine speed and engine position in the event the crankshaft tone wheel 112 is lost. For example, with respect to camshaft tone wheel 120, the second transitions 125*a*, 125*b*, 125*c*, 125*d* are evenly spaced around the wheel member 131. This information can be used to measure engine speed. The passage of the unevenly spaced first transitions 124*a*, 124*b*, 124*c*, 124*d* can then be measured against a common clock along with predictions about the first transitions 124*a*, 124*b*, 124*c*, 124*d* to resolve the engine position and schedule the combustion event timing.

Controller 106 can be configured to determine engine position using any high-low-high or low-high-low sequence of transitions 124*a*, 125*a*, 124*b*, 125*b*, 124*c*, 125*c*, 124*d*, 125*d* and any reasonably constant reference, such as crank teeth or a fixed rate timer. In an embodiment, the crank tooth reference is provided by indicators 114*a*, 114*b*, . . . 114*n*. The crank tooth reference makes the engine position detection immune to changes in engine velocity due to the mechanical coupling between the crankshaft and camshaft, which are a noise factor when using a timer.

In an embodiment, controller 106 is configured to determine an absolute count of indicators 114*a*, 114*b*, . . . 114*n* and a relative count of indicators 114*a*, 114*b*, . . . 114*n* associated with the transitions 124*a*, 125*a*, 124*b*, 125*b*, 124*c*, 125*c*, 124*d*, 125*d*. The relative count is the number of indicators 114*a*, 114*b*, . . . 114*n* between sequential transitions 124*a*, 125*a*, 124*b*, 125*b*, 124*c*, 125*c*, 124*d*, 125*d*. The combination of binary feature polarity (high or low) and relative count is unique for all sequential transitions 124*a*, 125*a*, 124*b*, 125*b*, 124*c*, 125*c*, 124*d*, 125*d*, and identifies the transition sequence. There is an absolute indicator count (e.g. between 0-119 for a crankshaft tone wheel with 119 indicators 114*a*, 114*b*, . . . 114*n*) associated with every transition 124*a*, 125*a*, 124*b*, 125*b*, 124*c*, 125*c*, 124*d*, 125*d*. Once the relative count is determined, the exact engine position is determined by using the known absolute count at the same transition 124*a*, 125*a*, 124*b*, 125*b*, 124*c*, 125*c*, 124*d*, 125*d* where the relative count was obtained.

In an embodiment employing a fixed rate timer, an equivalent reference to the relative count of indicators 114*a*, 114*b*, . . . 114*n* is provided at constant velocity. Once the relative count is determined, the observed binary feature can be identified and engine position resolved by referencing the calibrated (i.e. known) absolute crank angle at the most recent transition 124*a*, 125*a*, 124*b*, 125*b*, 124*c*, 125*c*, 124*d*, 125*d*.

Alternatively to employing Bayesian algorithm analysis, other types of feature detection or pattern recognition algorithms could be employed to resolve the engine position to identify the current location on the camshaft tone wheel 120, 220.

As is evident from the figures and text presented above, a variety of aspects of the engine speed and position sensing system and camshaft tone wheels are contemplated.

According to one aspect of the present disclosure, an engine speed and position sensing system is provided, The system includes a crankshaft tone wheel including a plurality of indicators positioned around the crankshaft tone wheel and at least one interruption in the plurality of indicators. The system further includes a camshaft tone wheel including a plurality of binary features positioned around the camshaft tone wheel. Adjacent ones of the plurality of binary features each define one of a first transition or a second transition, the second transitions being located between adjacent ones of the first transitions, and the plurality of first transitions are located at unique angular spacings from one another about the camshaft tone wheel. The system includes a sensor arrangement operable to provide an output indicative of a passage of the plurality of indicators of the crankshaft tone wheel and a passage of the first and second transitions of the camshaft tone wheel. The system also includes a control unit configured to resolve an engine position in response to the passage of a number of the plurality of indicators of the crankshaft tone wheel that identifies at least one of the first and second transitions of the camshaft tone wheel.

In an embodiment of the system, each transition is identified by a transition type and a number of the plurality of indicators that correspond to an angular rotation of the camshaft tone wheel relative to the crankshaft tone wheel.

In a further embodiment, the plurality of binary features include a number of paired binary features, and each one of the paired binary features are located in a corresponding segment of the camshaft tone wheel, and each of the segments of the camshaft tone wheel has an angular sweep about the camshaft tone wheel that is associated with a corresponding number of indicators of the crankshaft tone wheel.

In an embodiment of the system, the sensor arrangement includes a first sensor associated with the crankshaft tone wheel and a second sensor associated with the camshaft tone wheel.

In an embodiment of the system, the plurality of indicators of the crankshaft tone wheel are teeth distributed about a periphery of the crankshaft tone wheel, the teeth being separated by gaps, and the interruption is two missing teeth. In addition, each of the binary features of the camshaft tone wheel is defined by one of a raised area or a lower area.

In a further embodiment, the plurality of binary features include opposing binary features positioned on opposite sides of the camshaft tone wheel, and one of the opposing binary features is raised area and the other of the opposing binary features is a lower area, and one of the raised and lower areas is synced with the at least one interruption of the crankshaft tone wheel.

In an embodiment of the system, the plurality of binary features is related to a total number of combustion events operated by the control unit. In an embodiment of the system, the second transitions are located equi-angularly from one another about the camshaft tone wheel.

According to another aspect of the present disclosure, a tone wheel for a camshaft is provided. The tone wheel includes a circular member having a rotational center and a plurality of angular regions positioned around the rotational center. Each of the plurality of angular regions includes a pair of binary features with a transition between the pair of binary features that is uniquely positioned within the respective angular region in relation to a positioning of the transitions within the other angular regions.

In an embodiment of the tone wheel, each of the pair of binary features includes a first feature that is raised from the circular member relative to a second feature, and the transition is defined by the junction between the first and second features.

In a further embodiment, the first and second features are located around a face of the circular member of the tone wheel. In a further embodiment, the first and second features are located around a perimeter of the circular member of the tone wheel.

In an embodiment of the tone wheel, the plurality of angular regions subtend equi-angular arcs about the rotational center. In a further embodiment, the plurality of angular regions includes at least four angular regions.

In an embodiment of the tone wheel, the plurality of angular regions includes a first angular region subtending a first arc about the rotational center and a second angular region subtending a second arc about the rotational center from the end of the first angular region. The paired binary feature of the first angular region includes a first feature subtending a first portion of the first arc from a start of the first angular region and a second feature subtending a second portion of the first arc to an end of the first angular region. The paired binary feature of the second angular region includes a third feature subtending a first portion of the second arc from the end of the first angular region and a fourth feature subtending a second portion of the second arc to an end of the second angular region. An angle subtended by the first arc is the same as an angled subtended by the second arc, an angle subtended by the first portion of the first arc differs from an angle subtended by the first portion of the second arc, and an angle subtended by the second portion of the first arc differs from an angle subtended by the second portion of the second arc.

In a further embodiment of the tone wheel, a third angular region subtends a third arc about the rotational center, and a fourth angular region subtends a fourth arc about the rotational center from the end of the third angular region. The paired binary feature of the third angular region includes a fifth feature subtending a first portion of the third arc from the end of the second angular region and a sixth feature subtending a second portion of the third arc to an end of the third angular region. The paired binary feature of the fourth angular region includes a seventh feature subtending a first portion of the fourth arc from the end of the third angular region and an eighth feature subtending a second portion of the fourth arc to an end of the fourth angular region. An angle subtended by the third and fourth arcs is the same as the angle subtended by the first and second arcs. Angles subtended by the first portions of the third and fourth arcs differ from one another and differ from the angles subtended by the first portions of the first and second arcs. Angles subtended by the second portions of the third and fourth arcs differ from one another and differ from the angles subtended by the second portions of the first and second arcs.

In a further embodiment, the tone wheel includes a fifth angular region subtending a fifth arc about the rotational center and a sixth angular region subtending a sixth arc about the rotational center from the end of the fifth angular region. The paired binary feature of the fifth angular region includes a ninth feature subtending a first portion of the fifth arc from the end of the fourth angular region and a tenth feature subtending a second portion of the fifth arc to an end of the fifth angular region. The paired binary feature of the sixth angular region includes an eleventh feature subtending a first portion of the sixth arc from the end of the fifth angular region and a twelfth feature subtending a second portion of the sixth arc to an end of the sixth angular region. An angle subtended by the fifth and sixth arcs is the same as the angle subtended by the first, second, third, and fourth arcs. Angles subtended by the first portions of the fifth and sixth arcs differ from one another and differ from the angles subtended by the first portions of the first, second, third, and fourth arcs. Angles subtended by the second portions of the fifth and sixth arcs differ from one another and differ from the angles subtended by the second portions of the first, second, third and fourth arcs.

According to another aspect of the present disclosure, a method for determining an engine position is provided. The method includes sensing a transition between a pair of binary features of a camshaft tone wheel as the camshaft wheel rotates; determining a number of indicators of a rotating crankshaft tone wheel associated with the sensed transition; and resolving the engine position based on the number of indicators associated with the sensed transition.

In an embodiment of the method, the transition is a first transition. The method further includes sensing a next transition between a second pair of binary features of the camshaft tone wheel; determining a second number of indicators of the crankshaft tone wheel associated with the sensed next transition; and resolving the engine position based on the second number of indicators associated with the sensed next transition in addition to the number of indicators associated with the sensed first transition.

In an embodiment, the method includes determining the engine position based on a time for the camshaft tone wheel to rotate from one transition to the next transition.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An engine speed and position sensing system, the system comprising:

a crankshaft tone wheel including a plurality of indicators positioned around the crankshaft tone wheel and at least one interruption in the plurality of indicators;

a camshaft tone wheel including a periphery and a face extending from a rotational center of the camshaft tone wheel to the periphery, the camshaft tone wheel including a plurality of binary features formed by raised and lowered areas positioned on the face around the camshaft tone wheel, wherein adjacent ones of the plurality of binary features each define one of a first transition or a second transition, the second transitions being located between adjacent ones of the first transitions, and the plurality of first transitions are located at unique angular spacings from one another about the camshaft tone wheel;

a sensor arrangement operable to provide an output indicative of a passage of the plurality of indicators of the crankshaft tone wheel and a passage of the first and second transitions of the camshaft tone wheel; and a control unit configured to resolve an engine position in response to the passage of a number of the plurality of indicators of the crankshaft tone wheel that identifies at least one of the first and second transitions of the camshaft tone wheel.

2. The system of claim 1, wherein each of the first transitions and the second transitions is identified by a transition type and a number of the plurality of indicators that correspond to an angular rotation of the camshaft tone wheel relative to the crankshaft tone wheel.

3. The system of claim 1, wherein the sensor arrangement includes a first sensor associated with the crankshaft tone wheel and a second sensor associated with the camshaft tone wheel.

4. The system of claim 1, wherein:

the plurality of indicators of the crankshaft tone wheel are teeth distributed about a periphery of the crankshaft tone wheel, the teeth being separated by gaps, and the interruption is two missing teeth; and each of the binary features of the camshaft tone wheel is defined by one of a raised area or a lower area.

5. The system of claim 1, wherein the second transitions are located equi-angularly from one another about the camshaft tone wheel.

6. An engine speed and position sensing system, the system comprising:

a crankshaft tone wheel including a plurality of indicators positioned around the crankshaft tone wheel and at least one interruption in the plurality of indicators;

a camshaft tone wheel including a plurality of binary features positioned around the camshaft tone wheel, wherein adjacent ones of the plurality of binary features each define one of a first transition or a second transition, the second transitions being located between adjacent ones of the first transitions, and the plurality of first transitions are located at unique angular spacings from one another about the camshaft tone wheel, wherein:

each of the first transitions and the second transitions is identified by a transition type and a number of the plurality of indicators that correspond to an angular rotation of the camshaft tone wheel relative to the crankshaft tone wheel; and the plurality of binary features include a number of paired binary features, and each one of the paired binary features are located in a corresponding segment of the camshaft tone wheel, and each of the segments of the camshaft tone wheel has an angular sweep about the camshaft tone wheel that is associated with a corresponding number of indicators of the crankshaft tone wheel;

a sensor arrangement operable to provide an output indicative of a passage of the plurality of indicators of the crankshaft tone wheel and a passage of the first and second transitions of the camshaft tone wheel; and a control unit configured to resolve an engine position in response to the passage of a number of the plurality of indicators of the crankshaft tone wheel that identifies at least one of the first and second transitions of the camshaft tone wheel.

7. The system of claim 6, wherein the plurality of binary features is related to a total number of combustion events operated by the control unit.

8. An engine speed and position sensing system, the system comprising:

a crankshaft tone wheel including a plurality of indicators positioned around the crankshaft tone wheel and at least one interruption in the plurality of indicators, wherein the plurality of indicators of the crankshaft tone wheel are teeth distributed about a periphery of the crankshaft tone wheel, the teeth being separated by gaps, and the at least one interruption is two missing teeth;

a camshaft tone wheel including a plurality of binary features positioned around the camshaft tone wheel, wherein adjacent ones of the plurality of binary features each define one of a first transition or a second transition, the second transitions being located between adjacent ones of the first transitions, and the plurality of first transitions are located at unique angular spacings from one another about the camshaft tone wheel, wherein each of the first transitions and the second transitions is identified by a transition type and a number of the plurality of indicators that correspond to an angular rotation of the camshaft tone wheel relative to the crankshaft tone wheel, wherein:

each of the binary features of the camshaft tone wheel is defined by one of a raised area or a lower area; and the plurality of binary features include opposing binary features positioned on opposite sides of the camshaft tone wheel, and one of the opposing binary features is raised area and the other of the opposing binary features is a lower area, and one of the raised and lower areas is synced with the at least one interruption of the crankshaft tone wheel;

a sensor arrangement operable to provide an output indicative of a passage of the plurality of indicators of the crankshaft tone wheel and a passage of the first and second transitions of the camshaft tone wheel; and a control unit configured to resolve an engine position in response to the passage of a number of the plurality of indicators of the crankshaft tone wheel that identifies at least one of the first and second transitions of the camshaft tone wheel.

9. The system of claim 8, wherein each of the first transitions and the second transitions is identified by a transition type and a number of the plurality of indicators that correspond to an angular rotation of the camshaft tone wheel relative to the crankshaft tone wheel.

10. The system of claim 8, wherein the plurality of binary features is related to a total number of combustion events operated by the control unit.

11. An engine speed and position sensing system, the system comprising:

a crankshaft tone wheel including a plurality of indicators positioned around the crankshaft tone wheel and at least one interruption in the plurality of indicators;

a camshaft tone wheel including a plurality of binary features positioned around the camshaft tone wheel, wherein adjacent ones of the plurality of binary features each define one of a first transition or a second transition, the second transitions being located between adjacent ones of the first transitions, and the plurality of first transitions are located at unique angular spacings from one another about the camshaft tone wheel;

a sensor arrangement operable to provide an output indicative of a passage of the plurality of indicators of the crankshaft tone wheel and a passage of the first and second transitions of the camshaft tone wheel; and a control unit configured to resolve an engine position in response to the passage of a number of the plurality of indicators of the crankshaft tone wheel that identifies at least one of the first and second transitions of the camshaft tone wheel, wherein the plurality of binary features is related to a total number of combustion events operated by the control unit.

12. The system of claim 11, wherein the second transitions are located equi-angularly from one another about the camshaft tone wheel.

13. The system of claim 11, wherein each of the first transitions and the second transitions is identified by a transition type and a number of the plurality of indicators that correspond to an angular rotation of the camshaft tone wheel relative to the crankshaft tone wheel.

14. The system of claim 13, wherein the plurality of binary features include a number of paired binary features, and each one of the paired binary features are located in a corresponding segment of the camshaft tone wheel, and each of the segments of the camshaft tone wheel has an angular sweep about the camshaft tone wheel that is associated with a corresponding number of indicators of the crankshaft tone wheel.

15. The system of claim 11, wherein the sensor arrangement includes a first sensor associated with the crankshaft tone wheel and a second sensor associated with the camshaft tone wheel.

16. The system of claim 11, wherein;

the plurality of indicators of the crankshaft tone wheel are teeth distributed about a periphery of the crankshaft tone wheel, the teeth being separated by gaps, and the interruption is two missing teeth; and each of the binary features of the camshaft tone wheel is defined by one of a raised area or a lower area.

17. The system of claim 16, wherein the plurality of binary features include opposing binary features positioned on opposite sides of the camshaft tone wheel, and one of the opposing binary features is raised area and the other of the opposing binary features is a lower area, and one of the raised and lower areas is synced with the at least one interruption of the crankshaft tone wheel.

18. A method for determining an engine position, the method comprising:

sensing a transition between a pair of binary features of a camshaft tone wheel as the camshaft wheel rotates, wherein the transition is a first transition;

determining a number of indicators of a rotating crankshaft tone wheel associated with the sensed first transition; and resolving the engine position based on the number of indicators associated with the sensed first transition;

sensing a next transition between a second pair of binary features of the camshaft tone wheel;

determining a second number of indicators of the crankshaft tone wheel associated with the sensed next transition; and resolving the engine position based on the second number of indicators associated with the sensed next transition in addition to the number of indicators associated with the sensed first transition.

19. The method of claim 18, further comprising determining the engine position based on a time for the camshaft tone wheel to rotate from the first one-transition to the next transition.

20. The method of claim 18, wherein the binary features are related to a total number of combustion events of the engine.

* * * * *